United States Patent
Hasegawa et al.

(10) Patent No.: US 10,938,289 B2
(45) Date of Patent: Mar. 2, 2021

(54) ACTUATOR

(71) Applicant: NIDEC SANKYO CORPORATION, Nagano (JP)

(72) Inventors: Yasushi Hasegawa, Nagano (JP); Kazuhiko Yanagisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 129 days.

(21) Appl. No.: 16/388,870

(22) Filed: Apr. 19, 2019

(65) Prior Publication Data

US 2019/0326803 A1  Oct. 24, 2019

(30) Foreign Application Priority Data

Apr. 19, 2018 (JP) .............................. JP2018-080489

(51) Int. Cl.
| | |
|---|---|
| *H02K 33/18* | (2006.01) |
| *H02K 33/16* | (2006.01) |
| *H01F 7/16* | (2006.01) |
| *H04M 19/04* | (2006.01) |

(52) U.S. Cl.
CPC ............ *H02K 33/18* (2013.01); *H02K 33/16* (2013.01); *H01F 7/1615* (2013.01); *H04M 19/047* (2013.01)

(58) Field of Classification Search
CPC ........ H02K 33/00; H02K 33/02; H02K 33/16; H02K 33/18; H02K 41/00; H01F 7/00; H01F 7/08; H01F 7/088; H01F 7/1615; H01F 7/1646
See application file for complete search history.

(56) References Cited

U.S. PATENT DOCUMENTS

| | | |
|---|---|---|
| 9,188,500 B2 | 11/2015 | Pezzin et al. |
| 10,097,072 B2 | 10/2018 | Xu et al. |
| 2013/0076178 A1 | 3/2013 | Kuroda et al. |

(Continued)

FOREIGN PATENT DOCUMENTS

| | | |
|---|---|---|
| CN | 102939521 | 2/2013 |
| CN | 203193471 | 9/2013 |

(Continued)

OTHER PUBLICATIONS

"Office Action of China Counterpart Application", dated Nov. 25, 2020, with English machine translation thereof, pp. 1-17.

*Primary Examiner* — Tran N Nguyen
(74) *Attorney, Agent, or Firm* — JCIPRNET (57) ABSTRACT

An actuator and a tactile device are provided. In the actuator, a gel member is disposed in a portion where a support body and a movable body face each other. The gel member is attached to the movable body and the support body by a first adhesive layer and a second adhesive layer. The gel member includes a first portion and a second portion having a higher hardness than an intermediate portion on a first adhesive layer side and a second adhesive layer side from the intermediate portion. If the thicknesses of the first adhesive layer and the second adhesive layer are changed, a spring constant of the gel member is changed. The first adhesive layer and the second adhesive layer are made to appropriate thicknesses. The gel member, the first adhesive layer and the second adhesive layer are addition reaction types, and the base polymers thereof are the same.

19 Claims, 8 Drawing Sheets

(56) References Cited

U.S. PATENT DOCUMENTS

2017/0216885 A1* 8/2017 Takeda .................. H01F 7/1615
2017/0310203 A1* 10/2017 Takeda .................... B06B 1/045

FOREIGN PATENT DOCUMENTS

| CN | 204425166 | 6/2015 |
| CN | 204442142 | 7/2015 |
| JP | 2015177655 | 10/2015 |

\* cited by examiner

ACTUATOR

CROSS REFERENCE TO RELATED APPLICATION

The present application claims priority under 35 U.S.C. § 119 to Japanese Application No. 2018-080489 filed Apr. 19, 2018, and the entire content of which is incorporated herein by reference.

TECHNICAL FIELD

At least an embodiment of the present disclosure relates to an actuator for vibrating a movable body and a tactile device.

BACKGROUND ART

An actuator comprising a movable body provided with a permanent magnet and a support body having a coil that is opposite to the permanent magnet has been proposed as a device for notifying information by vibration. In such an actuator, a technique in which a gel member is disposed in a portion in which the support body and the movable body face each other, and which suppresses a resonance of the movable body by controlling the resonance frequency by the gel member when the movable body is displaced relative to the support body has been proposed (refer to Japanese Unexamined Patent Application Publication No. 2015-177655). Further, Japanese Unexamined Patent Application Publication No. 2015-177655 proposes that the gel member is fixed by an adhesive relative to the support body and the movable body.

As the actuator described in Japanese Unexamined Patent Application Publication No. 2015-177655, when controlling the resonance frequency of a movable body by a gel member, it is necessary to set the spring constant of the gel member to an appropriate value and make the resonance frequency to an appropriate level. In order to do so, it is necessary to optimize the size and the material of the gel member in accordance with the mass and the like of the movable body. Therefore, there is the problem that it is necessary to prepare a gel member of a type which can correspond to each specification of the actuator in order to manufacture actuators in which a specification such as the mass of the movable body is different.

In consideration of the aforementioned problem, at least an embodiment of the present disclosure provides an actuator which can optimize the resonance frequency of the movable body even if the size or the material of a gel material for resonance prevention disposed between a support body and a movable body is not changed.

SUMMARY

In order to solve the aforementioned problem, the inventors of the present application, as the result of performing numerous examinations, obtained the new knowledge that when a gel member is fixed by an adhesive layer, the resonance frequency changes due to the thickness of the adhesive layer depending on the combination of the adhesive and the gel member. Further, as a result of the examinations by the inventors of the present application, the knowledge was obtained that the hardness of the portion positioned on the adhesive layer side in the thickness direction of the gel member increases when the gel member is fixed by the adhesive layer, and that if the thickness (the coating thickness of the adhesive) of the adhesive layer are made thicker, the thickness and the hardness increase in the portion in which the hardness on the adhesive layer side in the gel member increases. Therefore, it is considered that the reason for the aforementioned results is that the spring constant of the gel member changes due to the thickness of the adhesive layer, and the resonance frequency changes. The present disclosure was completed based on the aforementioned knowledge, and has the following configuration.

The actuator according to at least an embodiment of the present disclosure includes: a support body; a movable body, movable relative to the support body; a gel member, disposed in a portion in which the support body and the movable body face each other, so as to be in contact with both the support body and the movable body, and attached to one side member of the support body and the movable body by a first adhesive layer; and a magnetic drive circuit, which moves the moveable body relative to the support body. The gel member has a first portion having a higher hardness than the intermediate portion on a side of the first adhesive layer from an intermediate portion in the thickness direction where the support body and the movable body face each other.

In at least an embodiment of the present disclosure, the gel member is disposed in the portion in which the support body and the movable body face each other so as to be in contact with both the support body and the movable body, and the gel member absorbs vibrations when the movable body moves relative to the support body. Further, if the spring constant of the gel member is made to an appropriate value corresponding to the mass of the movable body, the resonance frequency of the movable body can be made to an appropriate value, and thus, the resonance of the movable body can be prevented. Here, the gel member is attached to one side member of the support body or the movable body by a first adhesive layer, and the gel member includes a first portion having a higher hardness than the intermediate portion in the first adhesive layer side from the intermediate portion in the thickness direction where the support body and the movable body face each other. The thickness and the hardness of the first portion change depending on the thickness (the coating thickness of the adhesive) of the first adhesive layer when the gel member is fixed by the first adhesive layer. Therefore, if the thickness (the coating thickness of the adhesive) of the first adhesive layer is set to an appropriate value corresponding to the mass of the movable body when the gel member is fixed by the first adhesive layer, the spring constant of the gel member can be made to an appropriate value, thus, the resonance frequency of the movable body can be made to an appropriate value, and the resonance of the movable body can be prevented. Therefore, when manufacturing actuators having a specification in which the mass of the movable body are different, the resonance frequency of the movable body can be made to an appropriate value by setting the thickness (the coating thickness of the adhesive) of the first adhesive layer to an appropriate value corresponding to the mass of the movable body even if the size and the material of the gel member corresponding to each specification of the actuator are not changed, and thus, the resonance of the movable body can be prevented.

At least an embodiment of the present disclosure may adopt a mode in which the base polymers in the gel member and the first adhesive layer are the same type. For example, at least an embodiment of the present disclosure may adopt a mode in which the base polymers of both the gel member and the first adhesive layer are silicone-based. According to this mode, the first portion having a higher hardness than the intermediate portion can be accurately formed on the first adhesive layer side of the gel member.

The present disclosure may adopt a mode in which both the gel member and the first adhesive layer are addition reaction types.

The present disclosure may adopt a mode in which the gel member is attached to the other side member of the support body or the movable body by a second adhesive layer. According to this mode, the gel member reliably follows the movement of the movable body, and thus, can effectively prevent the resonance of the movable body.

The present disclosure may adopt a mode in which the gel member has a second portion having a higher hardness than the intermediate portion in the second adhesive layer side from the intermediate portion.

The present disclosure may adopt a mode in which the base polymers in the gel member and the second adhesive layer are the same. For example, at least an embodiment of the present disclosure may adopt a mode in which the base polymers of both the gel member and the second adhesive layer are silicone-based. According to this mode, a second portion having a higher hardness than the intermediate portion can be accurately formed on the second adhesive layer side of the gel member.

The present disclosure may adopt a mode in which both the gel member and the second adhesive layer are addition reaction types.

The present disclosure may adopt a mode in which the first adhesive layer and the second adhesive layer have different thicknesses.

The present disclosure may adopt a mode in which the resonance frequency of the movable body relative to the support body is controlled by the gel member.

The present disclosure may adopt a mode in which the magnetic drive circuit is driven in the direction in which the movable body intersects the thickness direction relative to the support body. According to this mode, when the movable body is driven, the gel member deforms in the direction (the shear direction) which intersects the thickness direction, thus, a deformation characteristic in which the linear component (spring coefficient) is larger than the non-linear component (spring coefficient) is brought about. Therefore, the reproducibility of vibration acceleration in response to an input signal can be improved, and thus, it is possible to realize a nuanced vibration.

At least an embodiment of the present disclosure may adopt a mode in which the gel member is in a compressed state in the thickness direction between the support body and the movable body. According to this mode, the gel member reliably follows the movement of the movable body, and thus, can effectively prevent the resonance of the movable body.

At least an embodiment of the present disclosure may adopt a mode in which the movable body is supported on the support body solely by the gel member.

The tactile device according to at least an embodiment of the present disclosure includes: a support body; a movable body, movable relative to the support body; a gel member, disposed in a portion in which the support body and the movable body face each other, so as to be in contact with both the support body and the movable body, and attached to one side member of the support body and the movable body by a first adhesive layer; and a magnetic drive circuit, which moves the moveable body relative to the support body. The gel member has a first portion having a higher hardness than the intermediate portion on a side of the first adhesive layer from an intermediate portion in the thickness direction where the support body and the movable body face each other.

In at least an embodiment of the present disclosure, the gel member is disposed in the portion in which the support body and the movable body face each other so as to be in contact with both the support body and the movable body, and the gel member absorbs vibrations when the movable body moves relative to the support body. Further, if the spring constant of the gel member is made to an appropriate value corresponding to the mass of the movable body, the resonance frequency of the movable body can be made to an appropriate value, thus, the resonance of the movable body can be prevented. Here, the gel member is attached to one side member of the support body or the movable body by a first adhesive layer, and the gel member includes a first portion having a higher hardness than the intermediate portion in the first adhesive layer side from the intermediate portion in the thickness direction where the support body and the movable body face each other. The thickness and the hardness of the first portion change depending on the thickness (the coating thickness of the adhesive) of the first adhesive layer when the gel member is fixed by the first adhesive layer. Therefore, if the thickness (the coating thickness of the adhesive) of the first adhesive layer is set to an appropriate value corresponding to the mass of the movable body when the gel member is fixed by the first adhesive layer, the spring constant of the gel member can be made to an appropriate value, thus, the resonance frequency of the movable body can be made to an appropriate value, and the resonance of the movable body can be prevented. Therefore, when manufacturing actuators having a specification in which the mass of the movable body are different, the resonance frequency of the movable body can be made to an appropriate value by setting the thickness (the coating thickness of the adhesive) of the first adhesive layer to an appropriate value corresponding to the mass of the movable body even if the size and the material of the gel member are not changed to correspond to each specification of the actuator, and thus, the resonance of the movable body can be prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

At least an embodiment of the present disclosure will be explained below with reference to the drawings. In the following description, X is indicated in the linear motion direction (second direction, vibration direction) of a movable body 6, Z is indicated in the first direction which intersects the second direction X, and Y is indicated of the third direction which intersects the first direction Z and the second direction X. Note that, X1 is indicated on one side of the second direction X, X2 is indicated on the other side of the second direction X, Z1 is indicated on one side of the first direction Z, Z2 is indicated on the other side of the first direction Z, Y1 is indicated on one side of the third direction Y, and Y2 is indicated on the other side of the third direction Y. Further, in the following description, the case when one side member for supporting the coil is a support body 2, and the other side member for supporting the permanent magnet is the movable body 6 will mainly be explained.

(Entire Configuration)

Figure 1:
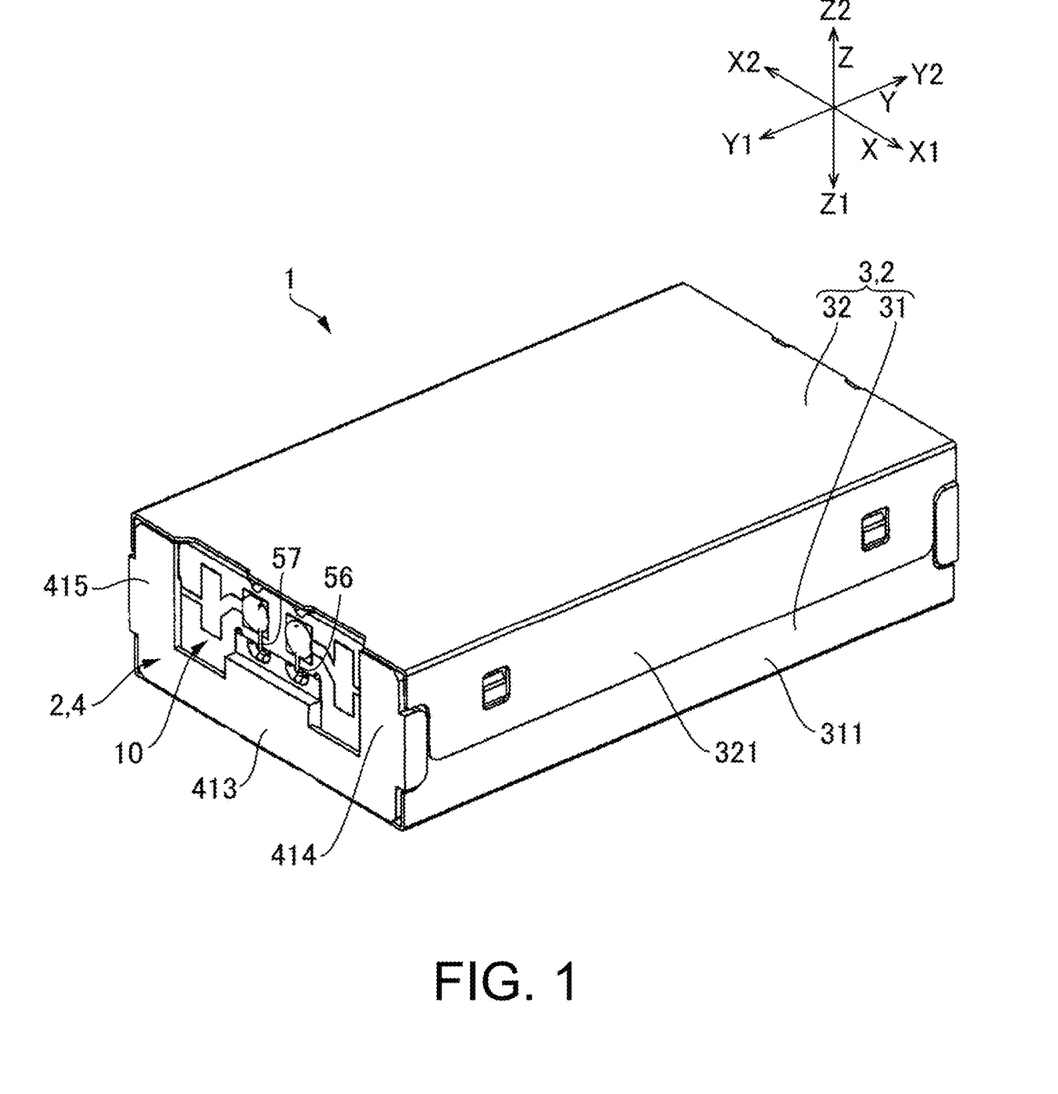
FIG. 1 is a perspective view illustrating an embodiment of an actuator used in at least an embodiment of the present disclosure.
Figure 2:
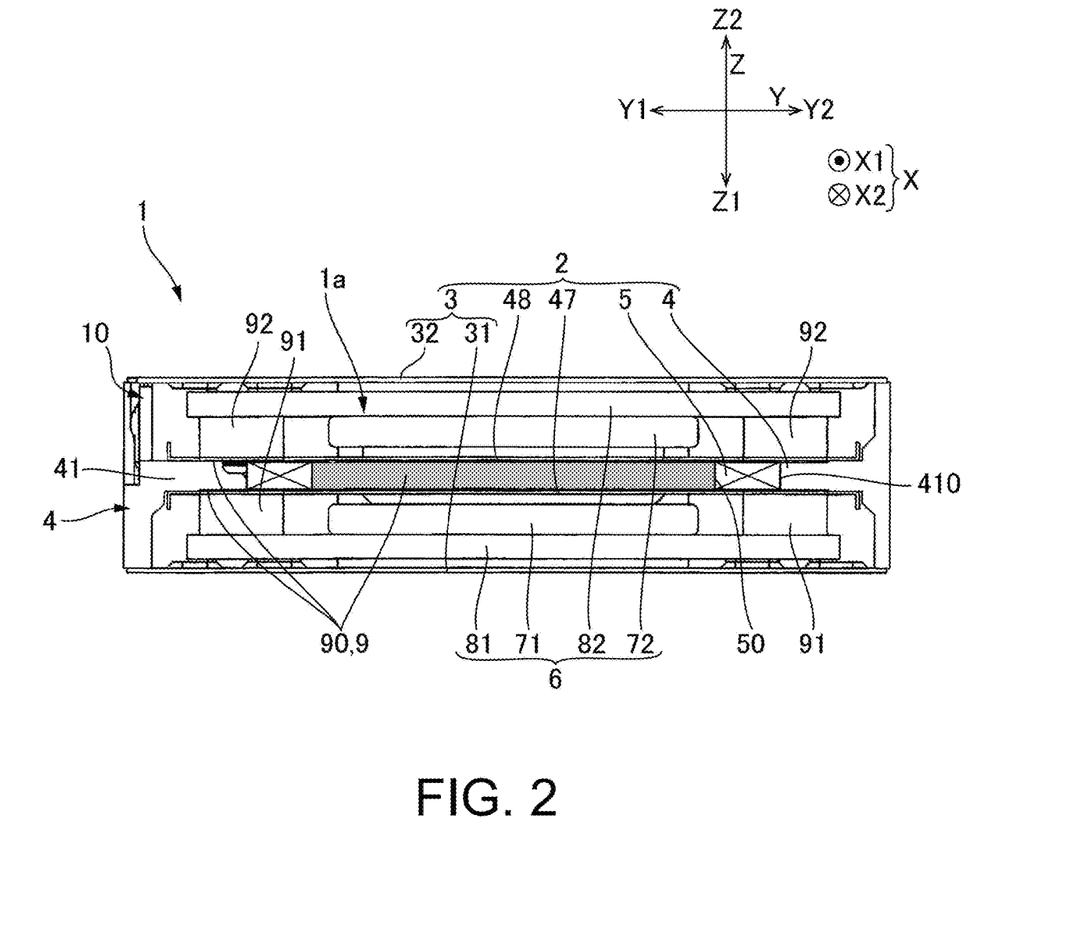
FIG. 2 is a YZ cross-sectional view of the actuator shown in FIG. 1.
Figure 3:
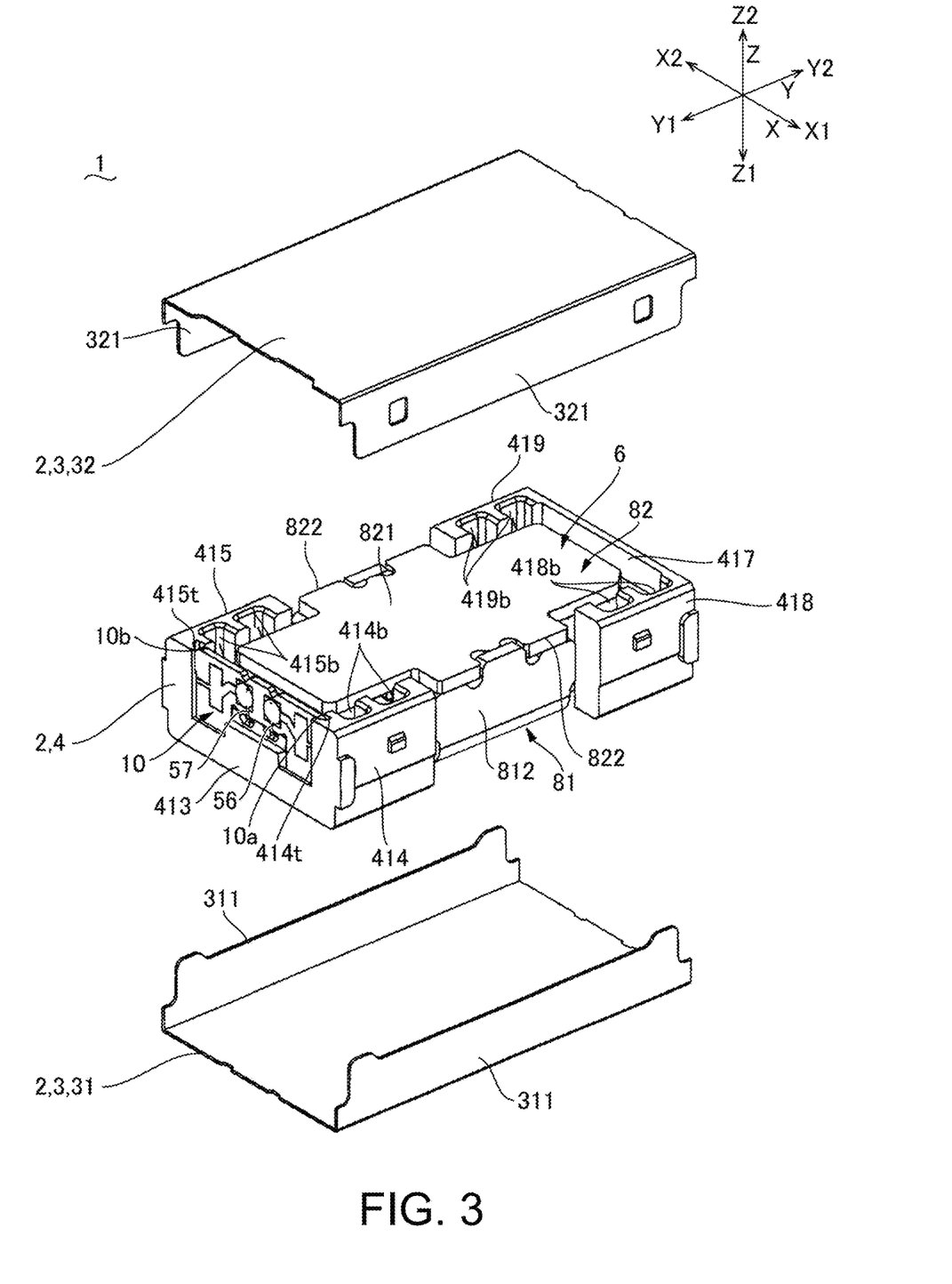
FIG. 3 is an exploded perspective view of the actuator shown in FIG. 1.
Figure 4:
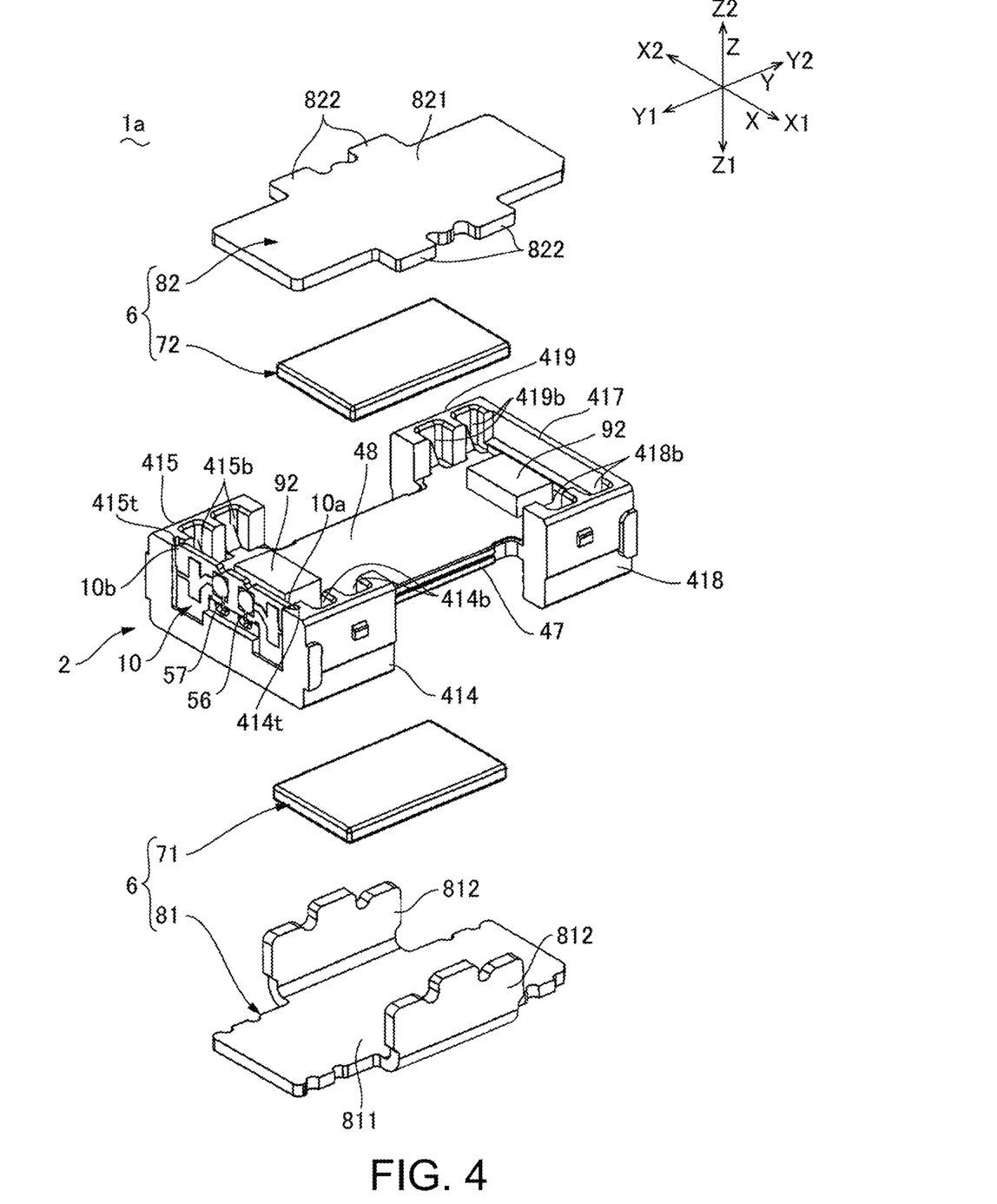
FIG. 4 is an exploded perspective view which separates the actuator shown in FIG. 1 into a support body and a movable body.
Figure 5:
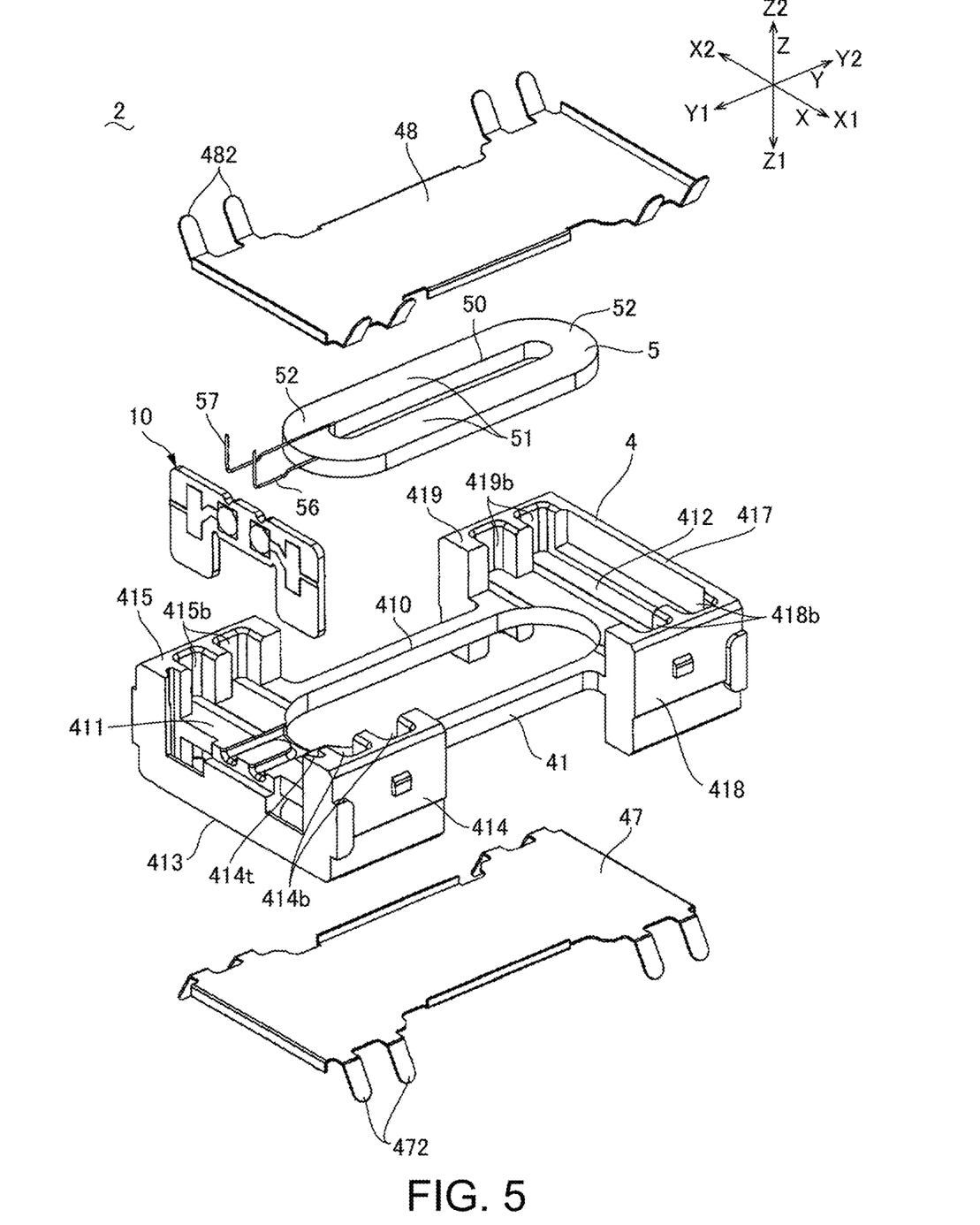
FIG. 5 is an exploded perspective view of the support body shown in FIG. 4 viewed from the other side of a first direction.

FIG. 1 is a perspective view illustrating an embodiment of an actuator 1 used in at least embodiment of the present disclosure. FIG. 2 is a YZ cross-sectional view of the actuator 1 shown in FIG. 1. FIG. 3 is an exploded perspective view of the actuator 1 shown in FIG. 1. FIG. 4 is an exploded perspective view which separates the actuator 1 shown in FIG. 1 into a support body 2 and a movable body 6. FIG. 5 is an exploded perspective view of the support body 2 shown in FIG. 4 viewed from the other side Z2 of the first direction Z.

The actuator 1 shown in FIG. 1 notifies the information to the user holding the actuator 1 by vibrating in the second direction X. Therefore, the actuator 1 can be used as an operation member of a game machine and the like, and functions as a tactile device (a haptic device) which can realize new sensations due to vibrations and the like.

As shown in FIG. 2, FIG. 3, FIG. 4 and FIG. 5, the actuator 1 includes: a support body 2 including a square case 3 and the like which defines the outer shape of the actuator 1, and a movable body 6 supported on the inside of the case 3 so as to be movable in the second direction X with respect to the support body 2, and the movable body 6 outputs information by vibrating in the second direction X.

The support body 2 includes a case 3, a coil holder 4, a coil 5 and a power feeding substrate 10, and the movable body 6 includes permanent magnets (first permanent magnet 71 and second permanent magnet 72) and yokes (first yoke 81 and second yoke 82). The coil 5 and the permanent magnet (the first permanent magnet 71 and the second permanent magnet 72) constitute a magnetic drive circuit 1a for moving the movable body 6 relative to the support body 2. The movable body 6 is supported on the support body 2 via gel members 91 and 92 provided between the movable body 6 and the support body 2.

(Configuration of the Movable Body 6)

As shown in FIG. 2, FIG. 3 and FIG. 4, the movable body 6 includes the first yoke 81 disposed on one side Z1 of the first direction Z relative to the coil 5, and the flat first permanent magnet 71 supported on the surface of the other side Z2 of the direction Z of the first yoke 81 so as to face the coil 5 on one side Z1 of the first direction Z. Further, the movable body 6 includes the second yoke 82 disposed on the other side Z2 of the first direction Z relative to the coil 5, and the flat second permanent magnet 72 supported on a face of one side Z1 of the first direction Z of the second yoke 82 so as to face the coil 5 on the other side Z2 of the first direction Z. In the present embodiment, the movable body 6 is constituted by the first yoke 81, the first permanent magnet 71, the second yoke 82, and the second permanent magnet 72.

The first yoke 81 includes a flat plate part 811 to which the first permanent magnet 71 is fixed, and a pair of connecting parts 812 bent to the other side Z2 of the first direction Z from the end part of both sides of the second direction X of the flat plate part 811. The second yoke 82 includes a flat plate part 821 to which the second permanent magnet 72 is fixed, and a pair of protruding parts 822 protruding on one side X1 and the other side X2 of the second direction X are included on the intermediate portion in the third direction Y of the 821. In the present embodiment, the pair of connecting parts 812 of the first yoke 81 is connected to the pair of protruding parts 822 by a method such as welding. Each of the first permanent magnet 71 and the second permanent magnet 72 is magnetized to a different pole than the one side X1 of the first direction and the other side X2 of the first direction.

(Configuration of the Support Body 2)

As shown in FIG. 1 and FIG. 2, in the support body 2, the case 3 includes a first case member 31 positioned on one side Z1 of the first direction Z, and a second case member 32 which overlaps the first case member 31 on the other side Z2 of the first direction Z, and a pair of the side plate parts 321 provided on both sides of the second direction X of the second case member 32 are respectively connected to a pair of side plate parts 311 provided on both sides of the second direction X of the first case member 31 to constitute the case 3. In this case, the coil holder 4, the coil 5 and the movable body 6 shown in FIG. 2 and FIG. 5 are accommodated between the first case member 31 and the second case member 32.

As shown in FIG. 5, the coil 5 is an air-core coil having an annular planar shape wound into an oblong shape, and is supported in the coil holder 4. The coil 5 is provided with two long side parts 51 parallel to the second direction X and extending in the third direction Y, and two circular arc-shaped short side parts 52 connecting both ends of the two long side parts 51 in the third direction Y. In the coil 5 constituted as such, the first permanent magnet 71 faces the long side parts 51 on one side Z1 of the first direction Z, and the second permanent magnet 72 faces to the other side Z2 of the first direction Z. The coil holder 4 includes a plate part 41 in which a coil placement hole 410 comprising an oblong-shaped through hole inside of which the coil 5 is disposed opens in the first direction Z.

In the end part 411 of the one side Y1 of the third direction Y of the plate part 41, side plate part 413 protrudes from the edge of the one side Y1 of the third direction Y toward the one side Z1 of the first direction Z, and side plate parts 414 and 415 protrude from the edge of the one side X1 of the second direction X and from the edge of the other side X2 of the second direction X toward the one side Z1 and the other side Z2 of the first direction Z. Among the inner surfaces of the side plate parts 414 and 415, the groove shaped recessed parts 414b and 415b extending in the first direction Z are formed on the other side Z2 of the first direction Z relative to the plate part 41. Further, among the inner surfaces of the side plate parts 414 and 415, the same groove shaped recessed parts (not shown) are also formed on one side Z1 of the first direction Z relative to the plate part 41.

In an end part 412 of the other side Y2 of the third direction Y of the plate part 41, side plate parts 417, 418 and 419 protrude from the edge of the other side Y2 of the third direction Y, the edge of the one side X1 of the second direction X, and the edge the other side X2 of the second direction X toward the one side Z1 and the other side Z2 of the first direction Z. Among the inner surfaces of side plate parts 418 and 419, groove shaped recessed parts 418b and 419b extending in the first direction Z are formed on the other side Z2 of the first direction Z relative to the plate part 41. Further, among the side plate parts 418 and 419, the groove shaped recessed parts (not shown) are also formed on one side Z1 of the first direction Z relative to the plate part 41.

Slits 414t and 415t are formed in the side plate parts 414 and 415. End parts 10a and 10b on both sides of the power feeding substrate 10 are supported in the slits 414t and 415t. End parts 56 and 57 of the coil edge constituting the coil 5 are connected to the power feeding substrate 10 by solder and the like.

(Configuration of First Plate 47 and Second Plate 48)

As shown in FIG. 2, FIG. 4, and FIG. 5, the support body 2 includes the first plate 47 which overlaps the coil placement hole 410 and the plate part 41 from one side Z1 of the first direction Z, and the coil 5 is fixed to the first plate 47 and the plate part 41 by an adhesive layer 9 comprising an adhesive 90 filled in at least an air-core part 50 of the coil. Therefore, the coil 5 faces the first permanent magnet 71 in the first direction Z via the first plate 47. Further, the first plate 47 is fixed in the plate part 41 by the adhesive layer.

Further, the support body 2 includes the second plate 48 which overlaps the coil placement hole 410 and the plate part 41 from the other side Z2 of the first direction Z, and the coil 5 is fixed to the second plate 48 by the adhesive layer 9 comprising the adhesive 90 filled in at least the air-core part 50 of the coil. Therefore, the coil 5 faces the second permanent magnet 72 in the first direction Z via the second plate 48. Further, the second plate 48 is fixed in the plate part 41 by the adhesive layer 9.

The first plate 47 and the second plate 48 are comprised of non-magnetic materials. In the present embodiment, the first plate 47 and the second plate 48 are comprised of metal plates. More specifically, the first plate 47 and the second plate 48 are comprised of non-magnetic stainless-steel plates.

The first plate 47 includes a pawl-shaped protruded part 472 which protrudes obliquely to one side Z1 of the first direction Z from both sides of the second direction X, and the protruded part 472 elastically abuts against the inside of the groove shaped recessed part (not shown) formed in the side plate parts 414, 415, 418 and 419, and is supported in the coil holder 4. The second plate 48 includes a pawl-shaped protruded part 482 which protrudes obliquely to the other side Z2 of the first direction Z from both sides in the second direction X, and the protruded part 482 elastically abuts against the inside of the groove shaped recessed parts 414b, 415b, 418b and 419b formed in the side plate parts 414, 415, 418 and 419, and is supported in the coil holder 4.

Therefore, regarding the actuator 1 of the present embodiment, the coil 5 is disposed on the inside of the coil placement hole 410 which passes through the plate part 41 of the coil holder 4 in the first direction Z, and the first plate 47 is disposed so as to overlap the coil placement hole 410 and the plate part 41 on one side Z1 of the first direction Z. Therefore, if the adhesive 90 is filled in the air-core part 50 of the coil 5, the adhesive 90 flows between the coil 5 and the coil holder 4, between the coil 5 and the first plate 47, and between the first plate 47 and the coil holder 4. Therefore, when the adhesive 90 is cured, the coil 5, the first plate 47, and the coil holder 4 are fixed by the adhesive layer 9. Therefore, unlike the case when an adhesive 90 flows in a gap space between the outer peripheral face of the coil 5 and the inner peripheral face of the coil placement hole 410, the coil 5 disposed in the coil placement hole 410 of the coil holder 4 can be appropriately adhered to the coil holder 4. Further, the first plate 47 is interposed between the first permanent magnet 71 and the coil 5. Therefore, even when the movable body 6 moved to the one side Z1 of the first direction Z, the first permanent magnet 71 and the coil 5 are not brought into direct contact with each other, thus, it is difficult to damage the coil 5. Further, the second plate 48 is interposed between the second permanent magnet 72 and the coil 5. Therefore, even when the movable body 6 moved to the other side Z2 of the first direction Z, the second permanent magnet 72 and the coil 5 are not brought into direct contact with each other, thus, it is difficult to damage the coil 5. Further, the first plate 47 and the second plate 48 are comprised of metal plates, thus, the heat generated by the coil 5 can be efficiently released through the first plate 47 and the second plate 48.

(Configuration of the Gel Members 91 and 92)

As shown in FIG. 2, FIG. 3, FIG. 4 and FIG. 5, the movable body 6 is supported to be movable in the second direction X and the third direction Y by only the gel members 91 and 92 provided between the movable body 6 and the support body 2. Therefore, in the present embodiment, a leaf spring and the like for supporting the movable body 6 to be movable in the second direction X and the third direction Y is not disposed between the movable body 6 and the support body 2. Therefore, the resonance frequency of the movable body 6 relative to the support body 2 is controlled by the gel members 91 and 92.

The gel member 91 is provided in a portion in which the first yoke 81 and the first plate 47 face each other in the first direction Z. The gel member 92 is provided in a portion in which the second yoke 82 and the second plate 48 face each other in the first direction Z. More specifically, the gel member 91 is provided in a portion in which the first yoke 81 and the first plate 47 face each other in the first direction Z at two positions (the short side part 52 side of the coil 5) separated from each other in the third direction Y. The gel member 92 is provided in a portion in which the second yoke 82 and the second plate 48 face each other in the first direction Z at two positions (the short side part 52 side of the coil 5) separated from each other in the third direction Y. Therefore, the movable body 6 can be supported to be movable in the second direction X without using a plate-shaped spring and the like.

In the present embodiment, the gel members 91 and 92 are made from a silicone gel and the like. In the present embodiment, the gel members 91 and 92 are made from a silicone gel having a needle entering level from 90 degrees to 110 degrees. The needle entering level indicates a value expressed in 1/10 mm units, of the depth at which a 1/4-cone needle bearing a total load of 9.38 grams at 25° C. entered for five seconds as specified in JIS-K-2207 and JIS-K and JIS-K-2220, and the smaller the value is, the harder the material is.

In the actuator 1 of the present embodiment, the gel members 91 and 92 are provided between the movable body 6 and the support body 2, thus, it is possible to suppress the movable body 6 from resonating. Here, the gel member 91 is provided between the first plate 47 and the first yoke 81, and the gel member 92 is provided between the second plate 48 and the second yoke 82. Therefore, a case 3 was not used to provide the gel members 91 and 92. Therefore, even if the case 3 was not used, the gel members 91 and 92 can be provided between the support body 2 and the movable body 6. Therefore, the gel members 91 and 92 can be provided during the assembly stage without the case 3, thus, the vibration characteristics including the damper characteristic can be measured while being manufactured. Further, the case 3 was not used to provide the gel members 91 and 92, thus, the gel members 91 and 92 can be provided to the actuator without the case 3.

Further, the gel members 91 and 92 are provided in positions facing each other in the first direction Z intersecting in the second direction X (vibration direction) in the support body 2 and the movable body 6, thus, when the movable body 6 vibrated in the second direction X, the gel members 91 and 92 deform in the shear direction to prevent the resonance. Therefore, even when the movable body 6 vibrates in the second direction X, the change of the elastic modulus of the gel members 91 and 92 is small, thus, the resonance of the movable body 6 can be effectively suppressed. Namely, the gel members 91 and 92 are viscoelastic members, and have linear or non-linear elongation/contraction characteristics depending on the expansion/contraction direction. For example, the gel members 91 and 92, when pressed in the thickness direction (axial direction) to be compressed and deformed, have elongation/contraction characteristics in which the non-linear component is larger than the linear component (spring coefficient), whereas in the case when stretched in the thickness direction (axial direction), the gel members 91 and 92 have elongation/contraction characteristics in which the linear component (spring coefficient) is larger than the non-linear component (spring coefficient). Further, when deformed in the direction (shear direction) intersecting the thickness direction (axial direction), the gel members 91 and 92 are deformed in a stretched direction regardless of the movement in any direction, and thus, have deformation characteristics in which the linear component (spring coefficient) is larger than the non-linear component (spring coefficient). In the present embodiment, the gel members 91 and 92 are configured so as to deform in the shear direction when the movable body 6 vibrates in the second direction X. Therefore, in the gel members 91 and 92, when the movable body 6 vibrated in the second direction X, the spring force becomes constant in accordance with the movement direction. Therefore, by using the shear direction spring elements of the gel members 91 and 92, the reproducibility of vibration acceleration in response to an input signal can be improved, thus, it is possible to realize a nuanced vibration.

Further, as described later with reference to FIG. 6 and FIG. 7, both surfaces of the gel members 91 and 92 in the first direction Z are respectively fixed to the movable body 6 and the support body 2 by the adhesive layer (the first adhesive layer 96 and the second adhesive layer 97) which will be described later. Therefore, the gel members 91 and 92 reliably follow the movement of the movable body 6, and thus, can effectively prevent the resonance of the movable body 6.

Further, the gel members 91 and 92 are in a compressed state in the first direction Z between the support body 2 and the movable body 6. Therefore, the gel members 91 and 92 reliably follow the movement of the movable body 6, and thus, can effectively prevent the resonance of the movable body 6.

(Operation)

In the actuator 1 of the present embodiment, when electricity is supplied to the coil 5 from the outside (host device) via the power feeding substrate 10, the movable body 6 reciprocates in the second direction X due to the magnetic drive circuit 1a provided with the coil 5, the first permanent magnet 71 and the second permanent magnet 72. Therefore, a user who has the actuator 1 in their hand can obtain information due to vibrations from the actuator 1. In this case, the frequency is changed for the signal waveform applied to the coil 5 depending on, for example, the information to be transmitted. Further, the polarity is reversed for the signal waveform applied to the coil 5, but in this case, a steep and gentle difference is provided with respect to the change in the voltage in the periods in which the polarity of the drive signal is negative and positive. As a result, a difference is generated between the acceleration when the movable body 6 moves to the one side X1 of the second direction X and the acceleration when the movable body 6 moves to the other side X2 of the second direction X. Therefore, the user can obtain the sensation that the actuator 1 moves to one side X1 or the other side X2 of the second direction X.

(Fixing Structure of the Gel Members 91 and 92)

Figure 6:
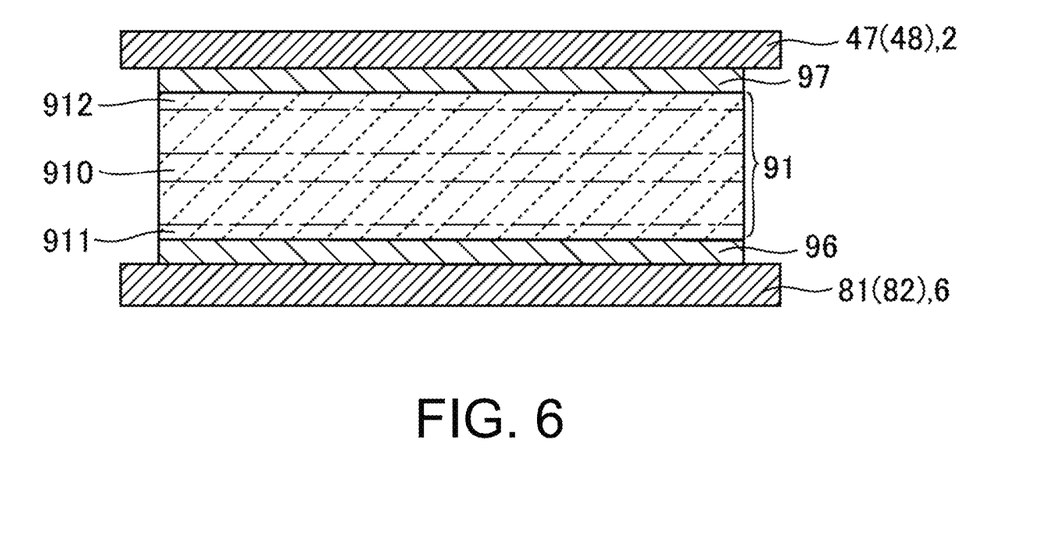
FIG. 6 is an explanatory view schematically illustrating a fixing structure of the gel members shown in FIG. 2.

FIG. 6 is an explanatory drawing schematically illustrating the fixing structure of the gel members 91 and 92 shown in FIG. 2. FIG. 7 is an explanatory drawing illustrating the method for fixing the gel members 91 and 92 shown in FIG. 6 by the adhesive layers (the first adhesive layer 96 and the second adhesive layer 97). FIG. 8 is a graph illustrating the relationship between the thickness of the adhesive layer (the first adhesive layer 96 and the second adhesive layer 97) and the resonance frequency of the movable body 6 shown in FIG. 6. Note that, the fixing of the gel member 91 and the fixing of the gel member 92 basically utilize the same configuration. Therefore, the fixing structure of the gel member 91 is mainly described.

As shown in FIG. 6, in the actuator 1 of the present embodiment, the gel member 91 is attached to one side member of the support body 2 or the movable body 6 by the first adhesive layer 96. Further, the gel member 91 is attached to the other side member of the support body 2 or the movable body 6 by the second adhesive layer 97. In the present embodiment, the gel member 91 adheres to the first yoke 81 of the movable body 6 by the first adhesive layer 96, and is fixed to the first plate 47 of the support body 2 by the second adhesive layer 97. Note that, as shown by the symbols in parentheses, the gel member 92 is attached to the second yoke 82 of the movable body 6 by the first adhesive layer 96, and is fixed to the second plate 48 of the support body 2 by the second adhesive layer 97.

In the present embodiment, the base polymer of the gel member 91, the first adhesive layer 96, and the adhesive layer 97 are the same. For example, the gel member 91 is a silicone gel in which the base polymer is an organopolysiloxane, and the first adhesive layer 96 and the second adhesive layer 97 are silicone-based adhesives in which the base polymer is an organopolysiloxane.

The gel member 91, the first adhesive layer 96, and the second adhesive layer 97 are all addition reaction types. Therefore, each of the gel member 91, the first adhesive layer 96, and the second adhesive layer 97 are produced by an addition reaction of a composition containing a base polymer, a curing catalyst, and a cross-linking agent.

The gel member 91, the first adhesive layer 96, and the second adhesive layer 97 are all two-liquid mixing type room temperature curable compositions. However, in the present embodiment, heating is performed in order to shorten the curing time when curing the first adhesive layer 96 and the second adhesive layer 97. Note that, the first adhesive layer 96 and the second adhesive layer 97 may be thermosetting types.

Figure 7:
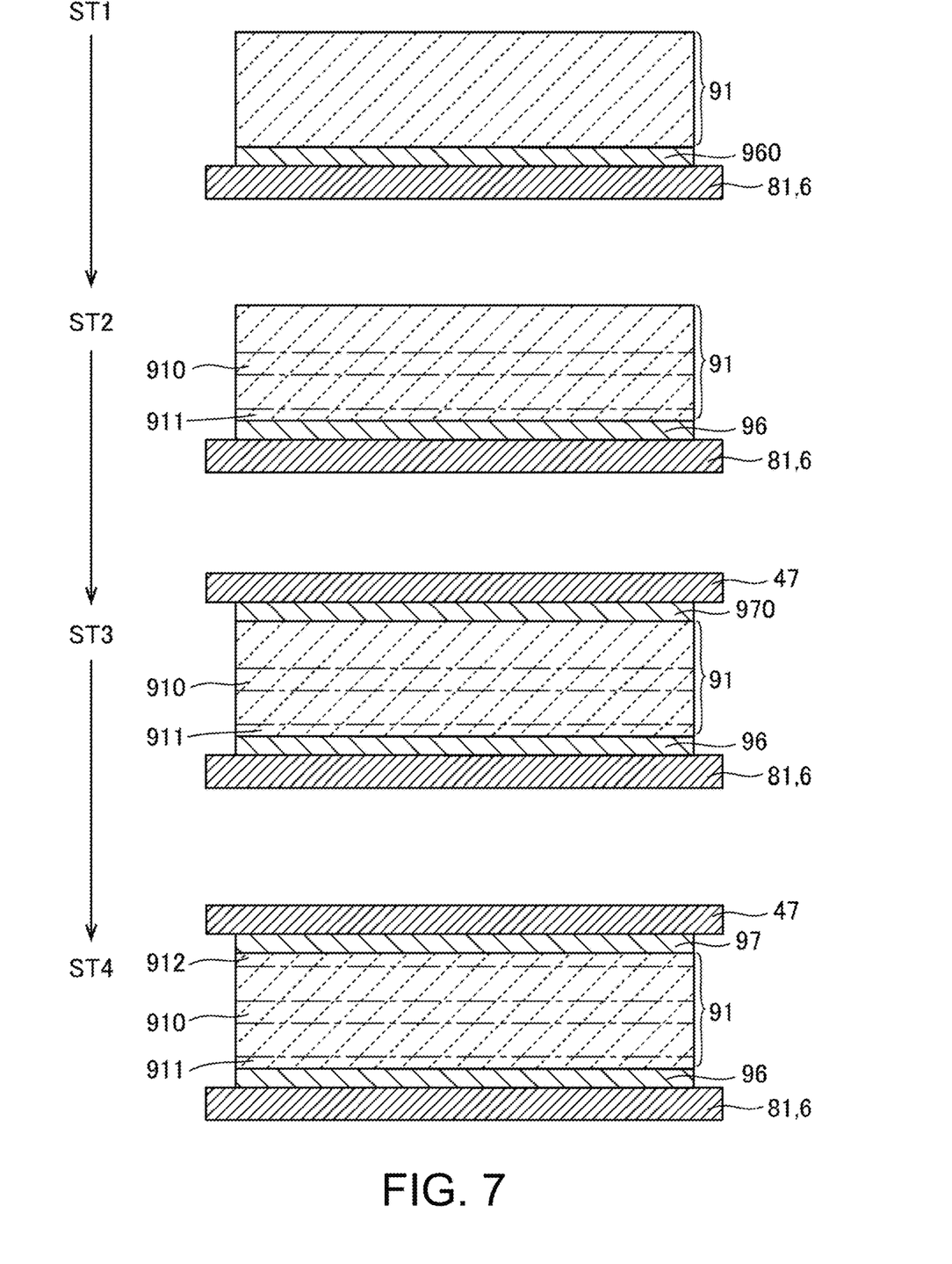
FIG. 7 is an explanatory view illustrating a method for fixing the gel member shown in FIG. 6 by an adhesive layer.
Figure 8:
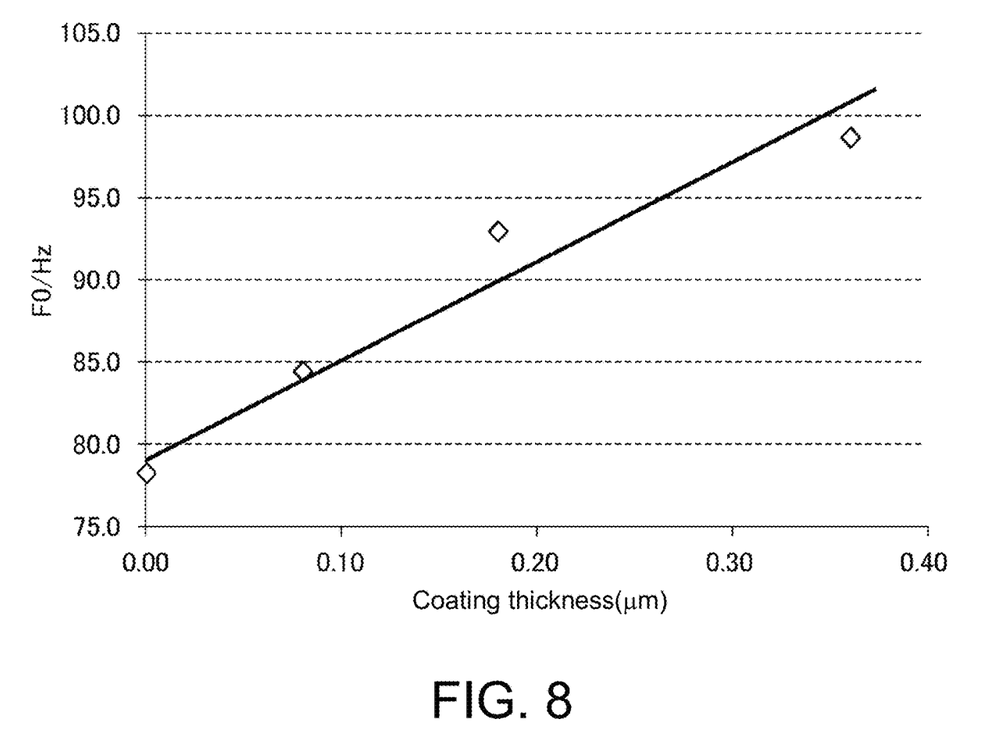
FIG. 8 is a graph illustrating the relationship between the thickness of the adhesive layer and the resonance frequency of the movable body shown in FIG. 6.

In the present embodiment, in order to fix the gel member 91 by the adhesive layer (the first adhesive layer 96 and the second adhesive layer 97), first, after coating the first adhesive 960 on the first yoke 81 in Step ST1 shown in FIG. 7, a first adhesive 960 is cured, and the gel member 91 is fixed to the first yoke 81 by the first adhesive layer 96 in Step ST2 shown in FIG. 7.

Next, in Step ST3 shown in FIG. 7, after coating a second adhesive 970 on the side of the first plate 47, the first plate 47 is overlapped on the gel member 91 via the second adhesive 970. Next, in Step ST4 shown in FIG. 7, the second adhesive 970 is cured, and the gel member 91 is fixed to the first plate 47 by the second adhesive layer 97.

The case when the gel member 92 was fixed is the same as the configurations described in FIG. 6 and FIG. 7.

The inventors of the present application obtained the new knowledge that when the gel members 91 and 92 were fixed by the adhesive relative to the support body 2 and the movable body 6, depending on the combination of the adhesive and the gel members 91 and 92, the resonance frequency F0 of the movable body 6 changes due to the thickness the first adhesive layer 96 and the second adhesive layer 97 as shown in FIG. 8. More specifically, the inventors of the present application obtained the new knowledge that the thicker that the thickness (the coating thickness of the first adhesive 960 and the second the adhesive 970) of the first adhesive layer 96 and the second adhesive layer 97 becomes, the more the resonance frequency F0 of the movable body 6 increases as shown in FIG. 8.

Further, the inventors of the present application obtained the knowledge that the hardness of the portion positioned on the adhesive layer side in the thickness direction of the gel members 91 and 92 increases when the gel members 91 and 92 were fixed by the first adhesive layer 96 and the second adhesive layer 97. Namely, as schematically shown in FIG. 6 and FIG. 7, the knowledge by which the first portion 911 (portion in which the needle entering level is small) having a higher hardness than the intermediate portion 910 on the first adhesive layer 96 side from the intermediate portion 910 in the thickness direction (the first direction Z) where the support body 2 and the movable body 6 face each other is generated, and the second portion 912 (portion in which needle entering level is small) having a higher hardness than the intermediate portion 910 on the second adhesive layer 97 side from the intermediate portion 910 is generated in the gel members 91 and 92 by the process for curing the first adhesive layer 96 and the second adhesive layer 97 was obtained.

Further, the knowledge was obtained that if the thicknesses (the coating thickness of the first adhesive 960 and the second adhesive 970) of the first adhesive layer 96 and the second adhesive layer 97 are made thicker, the thickness and the hardness increases in the portion (the first portion 911 and the second portion 912) in which the hardness of the adhesive layer side is high. Therefore, it is considered that the reason that the resonance frequency F0 of the movable body 6 changes due to the thickness of the first adhesive layer 96 and the second adhesive layer 97 as shown in FIG. 8 is because the spring constant of the gel member 91 changes due to the thickness of the first adhesive layer 96 and the second adhesive layer 97, and the resonance frequency of the movable body 6 changes.

Further, when the gel members 91 and 92 are fixed by the first adhesive layer 96 and the second adhesive layer 97, the reason that the portion (the first portion 911 and the second portion 912) in which the hardness is high is generated in the gel members 91 and 92 is not completely understood at present, but when curing the first adhesive 960 and the second the adhesive 970, it is considered that the portions (the first portion 911 and the second portion 912) in which the hardness is high are generated in the gel members 91 and 92 as a result of a cross-linking agent of the first adhesive 960 and the second adhesive 970, or an uncured base polymer permeating into the gel members 91 and 92.

Primary Effect of the Present Embodiment

As described above, in the actuator 1 of the present embodiment, the gel members 91 and 92 are disposed in the portion in which the support body 2 and the movable body 6 face each other so as to be in contact with both of the support body 2 and the movable body 6, and the gel members 91 and 92 absorb vibrations when the movable body 6 moves relative to the support body 2. Further, if the spring constant of the gel members 91 and 92 is made to an appropriate value corresponding to the mass of the movable body 6, the resonance frequency of the movable body 6 can be made to an appropriate value, thus, the resonance of the movable body 6 can be prevented.

Here, the gel members 91 and 92 are attached to each of the movable body 6 and the support body 2 by the first adhesive layer 96 and the second adhesive layer 97, each of the gel members 91 and 92 are composed of the first portion 911 and the second portion 912 having a hardness higher than the intermediate portion 910 on the first adhesive layer 96 side and the second adhesive layer 97 side from the intermediate portion 910. Further, the thickness and the hardness of the first portion 911 and the second portion 912 are changed due to the thickness (the coating thickness of the first adhesive 960 and the second the adhesive 970) of the first adhesive layer 96 and the second adhesive layer 97 when the gel members 91 and 92 are fixed. Therefore, if the coating thickness of the first adhesive 960 and the second adhesive 970 are set to an appropriate value corresponding to the mass of the movable body 6 when the gel members 91 and 92 are fixed, the spring constant of the gel members 91 and 92 can be made to an appropriate value, thus, the resonance frequency of the movable body 6 can be made to an appropriate value, and the resonance of the movable body 6 can be prevented. Therefore, when manufacturing the actuator 1 having a specification in which the mass of the movable body 6 is different, the resonance frequency of the movable body 6 can be made to an appropriate value by setting the coating thickness of the first adhesive 960 and the second adhesive 970 to an appropriate value corresponding to the mass of the movable body 6 even if the size and the material of the gel members 91 and 92 corresponding to each specification of the actuator 1 are not changed, and thus, the resonance of the movable body 6 can be prevented.

Further, the base polymer in the gel members 91 and 92 and the adhesive layer (the first adhesive layer 96 and the second adhesive layer 97) are the same type, thus, it is possible to reliably proceed with the phenomenon in which the cross-linking agent of the first adhesive 960 and the second the adhesive 970, or the uncured base polymer permeates into the gel members 91 and 92, so as to generate the portions (the first portion 911 and the second portion 912) having a higher hardness in the gel members 91 and 92.

Separate Embodiment

In the aforementioned embodiment, as shown in FIG. 6, the thickness of the first adhesive layer 96 is equivalent to the thickness of the second adhesive layer 97, but the thickness of the first adhesive layer 96 may be different from the thickness of the second adhesive layer 97.

In the aforementioned embodiment, each of the gel members 91 and 92 were fixed to both the support body 2 and the movable body 6 by the adhesive layers (the first adhesive layer 96 and the second adhesive layer 97), but the gel members 91 and 92 may be fixed to only one side member of the support body 2 and the movable body 6 by the adhesive layer (the first adhesive layer 96 or the second adhesive layer 97).

In the aforementioned embodiment, each of the gel members 91 and 92 were fixed to the support body 2 and the movable body 6 by the adhesive layers (the first adhesive layer 96 and the second adhesive layer 97), but the mode in which only one of the gel members 91 and 92 is fixed to the support body 2 and the movable body 6 by the adhesive layers (the first adhesive layer 96 and the second adhesive layer 97) may also be applied.

In the aforementioned embodiment, an addition reaction type silicone gel was used in the gel members 91 and 92, but at least an embodiment of the present disclosure may also be applied in the case when a condensation reaction type silicone gel was used. In the aforementioned embodiment, a silicone gel was used in the gel members 91 and 92, but at least an embodiment of the present disclosure may also be applied in the case when other gels are used.

Other Embodiment

In the aforementioned embodiment, the coil 5 may be provided in the support body 2, and the permanent magnet may be provided in the movable body 6, but at least an embodiment of the present disclosure may also be applied in an actuator in which the coil 5 was provided in the movable body 6, and the permanent magnet was provided in the support body 2. The aforementioned embodiment exemplified the actuator that vibrates the movable body 6 in the second direction X, but at least an embodiment of the present disclosure may also be applied in an actuator that vibrates the movable body 6 in the second direction X or the third direction Y.

What is claimed is:

1. An actuator, comprising
a support body;
a movable body, movable relative to the support body;
a gel member, disposed in a portion in which the support body and the movable body face each other, so as to be in contact with both of the support body and the movable body, and attached to one side member of the support body and the movable body by a first adhesive layer; and
a magnetic drive circuit that moves the moveable body relative to the support body,
wherein
the gel member comprises a first portion having a higher hardness than a hardness of an intermediate portion on a side of the first adhesive layer from the intermediate portion in a thickness direction wherein the support body and the movable body face each other in the thickness direction.

2. The actuator according to claim 1, wherein
base polymers in the gel member and the first adhesive layer are the same.

3. The actuator according to claim 2, wherein
the base polymers of both the gel member and the first adhesive layer are silicone-based.

4. The actuator according to claim 1, wherein
both the gel member and the first adhesive layer are addition reaction types.

5. The actuator according to claim 1, wherein
the gel member is attached to another side member of the support body and the movable body by a second adhesive layer.

6. The actuator according to claim 5, wherein
the gel member comprises a second portion having a higher hardness than the intermediate portion on a side of the second adhesive layer from the intermediate portion.

7. The actuator according to claim 5, wherein
the base polymers in the gel member and the second adhesive layer are the same.

8. The actuator according to claim 7, wherein
the base polymers of both the gel member and the second adhesive layer are silicone-based.

9. The actuator according to claim 5, wherein
both the gel member and the second adhesive layer are addition reaction types.

10. The actuator according to claim 5, wherein
the first adhesive layer and the second adhesive layer have different thicknesses.

11. The actuator according to claim 1, wherein
a resonance frequency of the movable body relative to the support body is controlled by the gel member.

12. The actuator according to claim 1, wherein
the magnetic drive circuit drives the movable body in a direction which intersects the thickness direction relative to the support body.

13. The actuator according to claim 1, wherein
the gel member is in a compressed state in the thickness direction between the support body and the movable body.

14. The actuator according to claim 1, wherein
the movable body is supported in the support body solely by the gel member.

15. The actuator according to claim 3, wherein
both the gel member and the first adhesive layer are addition reaction types.

16. The actuator according to claim 8, wherein
both the gel member and the second adhesive layer are addition reaction types.

17. The actuator according to claim 5, wherein
a resonance frequency of the movable body relative to the support body is controlled by the gel member.

18. The actuator according to claim 5, wherein
the gel member is in a compressed state in the thickness direction between the support body and the movable body.

19. A tactile device, comprising,
a support body;
a movable body, movable relative to the support body;
a gel member, disposed in a portion in which the support body and the movable body face each other, so as to be in contact with both of the support body and the movable body, and attached to one side member of the support body and the movable body by the first adhesive layer; and a magnetic drive circuit that moves the moveable body relative to the support body, wherein the gel member comprises a first portion having a higher hardness than a hardness of an intermediate portion on a side of the first adhesive layer from the intermediate portion in a thickness direction to wherein the support body and the movable body face each other in the thickness direction.

\* \* \* \* \*